United States Patent
Pueyo et al.

[11] Patent Number: 5,986,551
[45] Date of Patent: Nov. 16, 1999

[54] METHOD AND SYSTEM FOR PRESERVATION AGAINST PESKY BIRDS AND PEST ANIMALS

[76] Inventors: Jacques Pueyo; Josette Estines, both of C.P.1, Ste-Martine, Quebec, Canada, J0S 1V0

[21] Appl. No.: 08/829,913

[22] Filed: Mar. 27, 1997

[51] Int. Cl.[6] .......................... G08B 23/00; A01K 37/00
[52] U.S. Cl. .................. 340/573; 340/384.1; 340/384.2; 119/713
[58] Field of Search ..................... 340/573, 572, 340/552, 551, 384.1, 384.2, 384.3, 384.6; 119/713, 718, 719; 116/17, 22 A, 23

[56] References Cited

U.S. PATENT DOCUMENTS

| | | | |
|---|---|---|---|
| 4,475,102 | 10/1984 | Troy et al. | 340/573 |
| 4,965,552 | 10/1990 | Price et al. | 340/573 |
| 5,009,192 | 4/1991 | Burman | 340/573 |
| 5,302,938 | 4/1994 | Martineau | 340/573 |
| 5,418,518 | 5/1995 | Schenken et al. | 340/573 |
| 5,450,063 | 9/1995 | Peterson et al. | 340/573 |
| 5,463,595 | 10/1995 | Rodhall et al. | 340/573 |
| 5,602,523 | 2/1997 | Turchioe et al. | 340/573 |

*Primary Examiner*—Brent A. Swarthout
*Assistant Examiner*—Van T. Trieu
*Attorney, Agent, or Firm*—Quarles & Brady

[57] ABSTRACT

The method according to the invention is permanent preservation against pesky birds and pest animals from a site where they cause damages. The method comprises: a dislodging phase where at least two frightening devices are installed on the site. The number of devices installed depends on the kind of site and the surface area of the site. For a short period of time during the dislodging phase, an intensive action of the frightening devices is sustained to dislodge the birds. The dislodging phase is followed by a dissuasion phase to dissuade the birds from returning back to the site. The dissuasion phase includes an active action of the frightening devices for three days. The active action is less severe than the intensive action of the dislodging phase. Finally, there is a controlling phase including a continuous action of the frightening devices to permanently prevent any bird or animal from settling on the site.

9 Claims, 7 Drawing Sheets

| HECTARES | 0.5ha | 1ha | 2ha | 4ha | 8ha | 16ha | 30ha | 60ha | 100ha | 200ha | 400ha | 1A = 600ha |
|---|---|---|---|---|---|---|---|---|---|---|---|---|
| 1- AIRPORTS | | | | | | | | | | | 6<br>4RH<br>2FI | |
| 2- LANDFILLS | 1RH | 2<br>1RH<br>1FI | 2<br>1RH<br>1FI | | 3<br>1RH<br>2FI | 4<br>2RH<br>2FI | 8<br>4RH<br>4FI | | | | | |
| 3- INDUSTRIES | 1FI | 2<br>1RH<br>1FI | | | 3<br>1RH<br>2FI | 4<br>2RH<br>2FI | 5<br>2RH<br>3FI | | | | | |
| 4- PISCICULTURES | 1RH | 2<br>1RH<br>1FI | | | 3<br>2RH<br>1FI | | | | | | | |
| 5- ELECTRIC TRANSFORMER STATIONS | | 2<br>2FI | 3<br>3FI | 4<br>1RH<br>3FI | | | | | | | | |
| 6- CEREAL SILOS | 1FI | 2<br>1RH<br>1FI | 3<br>1RH<br>2FI | 4<br>2RH<br>2FI | | | | | | | | |
| 7- AGRI-CULTURE  A- FIELDS | | 1RH | 1RH | | 2<br>1RH<br>1FI | | | 3<br>2RH<br>1FI | 2<br>2RH | 4<br>2RH<br>1FI | 4<br>3RH<br>1FI | |
| B- NURSERIES ORCHARDS | | | | 3<br>3FI | 4<br>1RH<br>3FI | 6<br>2RH<br>4FI | | | 4<br>2RH<br>2FI | 7<br>4RH<br>3FI | 11<br>7RH<br>4FI | |
| 8- TOWNS A- PARKS PUBLIC PLACES | 1FI | 2<br>2FI | | | 4<br>2RH<br>2FI | | | | | | | |
| B- WASTEWATER TREATMENT | 1RH | 2<br>1RH<br>1FI | 3<br>2RH<br>1FI | | | | | | | | | |
| C- BEACHES | 2<br>2FI | 2<br>2FI | | | | | | | | | | |

*FIG. 1A*

| HECTARES | IA = 600ha | 800ha | 1200ha | 1600ha | 2400ha | 3200ha |
|---|---|---|---|---|---|---|
| 1-AIRPORTS | 9<br>6RH<br>3FI | 12<br>8RH<br>4FI | 18<br>12RH<br>6FI | 24<br>16RH<br>8FI | 30<br>20RH<br>10FI | |
| 2-LANDFILLS | | | | | | |
| 3-INDUSTRIES | | | | | | |
| 4-PISCICULTURES | | | | | | |
| 5-ELECTRIC TRANSFORMER STATIONS | | | | | | |
| 6-CEREAL SILOS | | | | | | |
| 7-AGRI-CULTURE  A - FIELDS<br>B - NURSERIES ORCHARDS | | | | | | |
| 8-TOWNS  A - PARKS, PUBLIC PLACES<br>B - WASTEWATER TREATMENT<br>C - BEACHES | | | | | | |

FIG. 1B

LEGEND FOR FIGS. 1A & 1B: FIRST NUMBER: No. OF DEVICES NEEDED,
RH: ROTATING-HUNTER, FI: FALCON-IMITATOR

METHOD AND SYSTEM FOR PRESERVATION AGAINST PESKY BIRDS AND PEST ANIMALS

FIELD OF THE INVENTION

The present invention relates to a method of scaring off pest animals such as birds, squirrels, racoons, roe deer from the places where they cause damage. More particularly, it relates to a method of permanently getting rid of birds and pest animals from a given site.

BACKGROUND OF THE INVENTION

The damages due to birds and animals in the human environment are very important. For example, in the airports, there are many crashes due to birds, with partial or total destruction of the aircraft and, sometimes, death of human beings. In the landfills, where many birds, such as gulls, come to eat, most of the garbage is spread out. As these birds are eating very toxic polluted food there, they pollute rivers and beaches with their excrements. The workers of the landfills have to endure unhealthy working conditions. Many pigeons are living in industry plants where they pollute the equipment and make them unhealthy for the workers. In the pisicultures, many birds are eating the fish and the companies are losing a lot of money per year. In the electrical transformer stations, almost two breakdowns out of three are due to birds or animals. Moreover, these birds and animals pollute the equipment, making them unhealthy for the workers. The silos of cereals are the favorite places to live for pigeons which pollute, with their excrements, the cereals in the silos or in the conveyors. Moreover, a large part of the crops in the agriculture is eaten or damaged by birds or animals. When there are too many in the town, pigeons, blackbirds, gulls pollute the ground, pavements, houses, bridges, as well as the parks, beaches, and the waste water treatment stations.

Many apparatuses and methods of scaring off birds and animals from the places where they cause damages have been developed in prior art but none of those has shown satisfactory results for permanently getting rid of these birds and animals.

Already known in prior art, there are the visual scaring devices, such as bird corpses preserved with formalin, Styrofoam cutouts of birds laid out on the grass, stuffed birds in abnormal positions, or dead birds hanging from posts. Drawbacks with these visual scaring methods are that they cannot be used during the night and that the birds and animals become accustomed. Use of lights has been tried for scaring birds but the birds soon become completely used to the flashing lights.

Use of lasers is not adequate at present. The laser beam has to be of such a high intensity that it would be highly hazardous for men. Other visual scaring methods such as colored smoke, blue balloons, and purplish coloration of the grass have been tried but were found unsuccessful or impractical.

Also known in the art are the acoustical scaring devices, for example, ultrasonic sounds, but most of the birds cannot hear them, because the frequency of bird hearing is the same as human hearing. Non natural sounds such as klaxon horns, bells, rattles, chimes, sirens, exploders, drums, are also known but they do not bother birds after a few hours.

There are also the natural sounds such as distress calls, territorial defence calls, flight calls, feeding calls, nest calls, flock calls, pleasure calls, aggressive calls and general alarm calls and specialized alarm calls. However, the reactions to broadcast distress calls vary with the species and the seasons and the birds become accustomed to these natural sounds after a few days.

Also known in the art, there are rotating-hunters and falcon-imitators. Although these devices may be efficient, they have been used in prior art on their own and with no particular method, thereby causing the birds and animals to become accustomed to those, after two or three weeks.

As can be appreciated, although the above methods and apparatuses are very numerous, which clearly shows that the problem is very important, none of these methods and apparatuses has been successful for permanently getting rid of birds and pest animals from a given site. The animals becoming rapidly accustomed to the scaring devices used. Therefore, there is presently a need for an apparatus or a method of permanently and successfully getting rid of birds and pest animals from a given site where they cause damage.

SUMMARY OF THE INVENTION

It is an object of the present invention to provide a method of preservation against birds and pest animals, that satisfies the above need.

In accordance with the present invention, this object is achieved with a method of preservation against birds or pest animals for a site having a given surface area. The method comprises:
a) a dislodging phase comprising the following steps:
   installation of at least two animal frightening device on the site, the devices being selected from the group consisting of rotating-hunters and falcon-imitators. The number of devices installed on the site depends on the kind of site and the surface area of the site; and
   intensive action of the bird frightening devices for a short period of time to dislodge the birds either present on the site or staying close to the site;
b) a dissuasion phase to dissuade the birds from returning back to the site, the dissuasion phase comprising the following steps:
   cleaning of the site, preferably including removal of any nest present; and
   active action of the bird frightening devices for at least one day, said active action being less severe than the intensive action of the dislodging phase a); and
c) a controlling phase to permanently prevent any bird from settling on the site, the controlling phase including a continuous action of the bird frightening devices.

Another object of the present invention is to propose a method of permanent preservation against birds for a site having a given surface area, the method comprising:
a) a preparation phase comprising the following step:
   installation of at least two bird frightening devices on the site, said devices being selected from the group consisting of rotating-hunters and falcon-imitators, the number of the devices installed on the site depending on the kind of site and the surface area of the site; and
b) a controlling phase to permanently prevent any bird from settling on the site, the controlling phase including a continuous action of the bird frightening devices.

Still another object of the present invention is to propose a method of permanently getting rid of animals from a site having a given surface area, the method comprising:
a) a preparation phase comprising the following step:
   installation of at least two animal frightening device on the site, the devices being selected from the group consisting of rotating-hunters and screamers, the number of the devices installed on the site depending on the surface area of the site; and b) a controlling phase to permanently prevent any animal from settling on the site, the controlling phase including a continuous action of the animal frightening devices where the animal frightening devices are each set to emit substantially many detonations per hour.

Advantageously, the method of preservation against birds and animals according to the present invention prevents the birds and animals from getting accustomed to the system. Therefore, the method allows to permanently and not just temporarily get rid of a flock of pest animals or birds from a given site.

A non restrictive description of a preferred embodiment of the invention will now be given with reference to the appended drawings.

BRIEF DESCRIPTION OF THE DRAWINGS

FIGS. 1A and 1B show a table in two parts giving the choice and number of devices to be installed on a site according to the surface area of the site and the kind of site;

DESCRIPTION OF PREFERRED EMBODIMENTS

Figure 2:
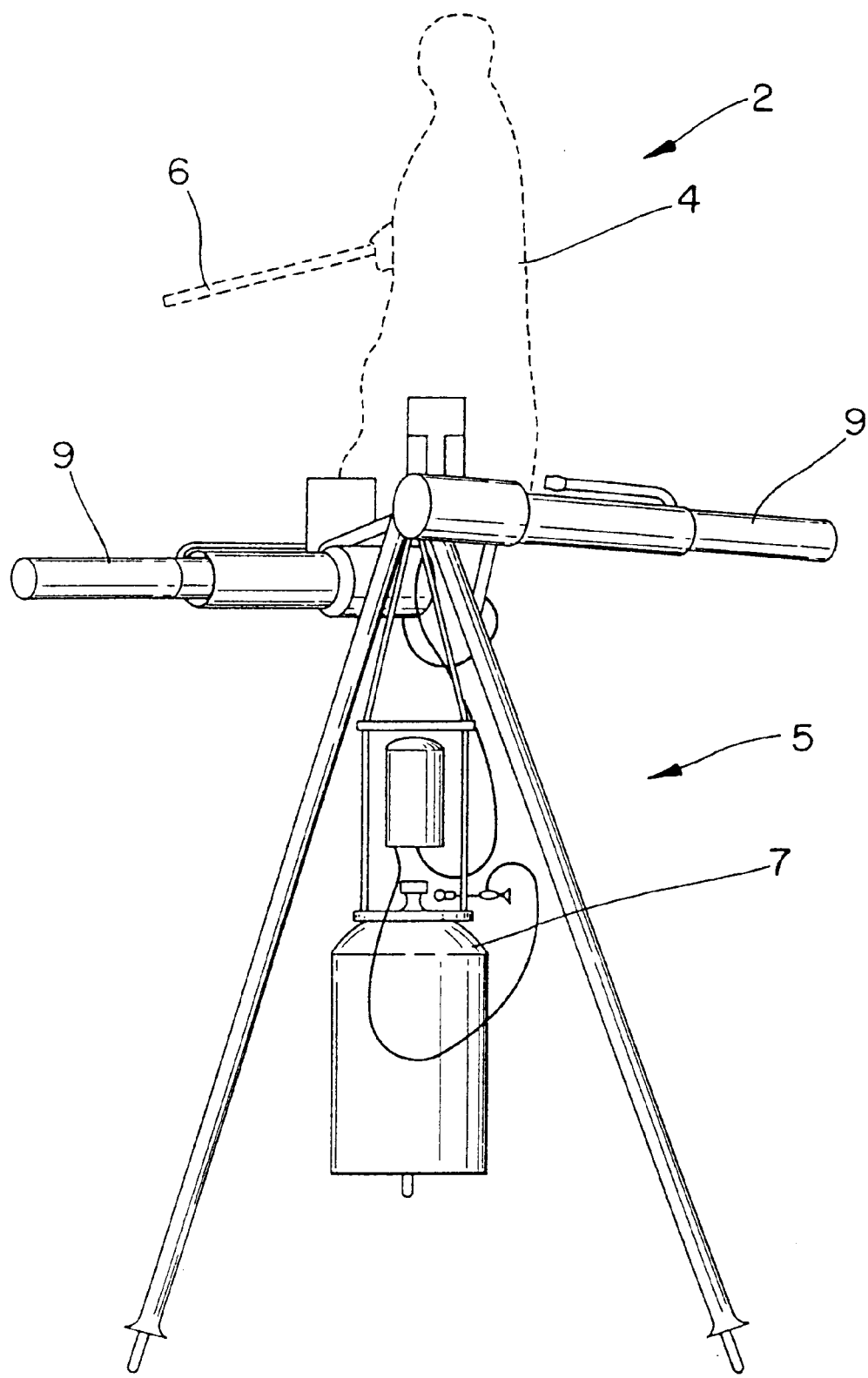
FIG. 2 is a perspective view of a rotating-hunter used in combination with other bird and animal frightening devices for performing a preferred embodiment of the method according to the present invention.

The invention concerns devices, equipment and methods to scare off birds and animals from the places where they cause damage. The devices, which may be used two or several at the same time, preferably include:

devices already known in the earlier processes, such as rotating-hunters, falcon-imitators, distress and special cries;

automation items, such as a sound alarm, an electronic weekly alarm or a motion detector of birds and animals;

surrounding equipments to make the scaring more efficient, such as anti-noise concrete screens and traps, ground adapters, hard climate adapters, scaring pellets, directional loudspeakers to increase the noise where the birds are staying and protect from noise the places without birds.

The method according to the invention relies on a topical scaring process for every kind of site, whose aim is to definitively and completely scare off birds and animals, while keeping them from becoming accustomed, without returning to the places from where they flew away, or they left.

The birds or animals leave the site definitely and never return.

A method according to the invention may advantageously be used for permanently getting rid of pesky birds such as gulls, pigeons, ospreys, great blue herons, blackbirds and pest animals such as squirrels, racoons, roe deer, deer, elks, moose, bears, lynx that are known to cause damages. The method comprises the following phases which will be more fully disclosed hereinafter: a dislodging or a preparation phase, a dissuasion phase and a controlling phase.

a) The dislodging phase

The dislodging phase comprises the following steps: installation of the equipments on the site followed by an intensive action of the bird or animal frightening devices on the site.

At least two bird or animal frightening devices are installed on the site. These devices are selected from the group consisting of rotating-hunters and falcon-imitators and the number of the devices installed on the site depends on the kind of site and the surface area of the site. Referring to FIGS. 1A and 1B, a table in two parts setting the choice and number of devices to be installed on a site according to the surface area of the site and the kind of site is illustrated. For example, if the site to be protected is an airport having a surface area comprised between 200 and 400 hectares, two rotating-hunters and two falcon-imitators are preferably installed on the site. If the site is an industry area having a surface area comprised between 16 and 30 hectares, two rotating-hunters and two falcon-imitators are preferably installed on the site. If the site is an electric transformer station having a surface area comprised between 2 and 4 hectares, three falcon-imitators are preferably installed on the site. And if the site is a waste water treatment station having a surface area comprised between 2 and 8 hectares, two rotating-hunters and one falcon-imitator are preferably installed on the site.

Preferably, the equipments are installed where their action may be increased. For example, they may be installed where the animals use to rest or where they are used to act. For example, in an airport area including a strawberry field, the equipment would be set at that place, or in a landfill, the equipment would be installed in the unloading zone.

Also preferably, the frightening devices are installed while the animals are temporarily absent from the site. In this case, the birds do not see the set up of the devices and, thereby they do not get used to these devices in a stand still position. Otherwise, the birds might not be so scared as the frightening devices get in function.

The installation is followed by an intensive action of the frightening devices for a short period of time to dislodge the birds either present on the site or staying close to the site. Intensive action means in an extreme degree. Thus, during the dislodging phase, the frightening devices are working at full power, preferably they are each set to emit at least one detonation every minute and a half. Also, between three to a hundred detonations are emitted with scaring pellets within the short period of time during which the intensive action of the dislodging phase a) is carried out is approximately 1 hour. It could be more or less than one hour, for example, but less than one day. As can be appreciated, the aim of this intensive action of the devices, for a short period of time, is to extremely frighten the birds living on the site or in the neighborhood.

b) The dissuasion phase

The object of the dissuasion phase which follows the dislodging phase is to dissuade the birds from returning back to the site. The dissuasion phase comprises the following steps: cleaning of the site, including removal of any nest present if the animals to be dislodged are birds, and an active action of the bird frightening devices as opposed to being passive or quiescent and being less severe than the intensive action of the dislodging phase a). Preferably, during this active action, the bird frightening devices are each set to emit substantially one detonation per three minutes at least. Preferably also, the dissuasion phase lasts from one to ten days, preferably three days.

With these devices, equipment, methods, during these two phases, the dislodging and dissuasion phases, and within four hours after the beginning of the dislodging, the birds which have been living on the site must find a new site to feed, drink, rest and sleep.

This new place being found, most of the birds leave their former area and do not come back.

c) The controlling phase

The object of the controlling phase is to permanently prevent any bird from settling on the site. The controlling phase includes a continuous action of the bird frightening devices. Preferably, the bird frightening devices are each set to emit substantially one detonation per 3 minutes to 30 minutes and launching of scaring pellets, twice a week, between three to one hundred explosions at each time, during the continuous action of the controlling phase c).

The following four factors of the actions ensure that the birds do not return to their former site and do not become accustomed to the devices during the controlling phase:

1. After they have been scared off once, they find their former place very hostile and dangerous.
2. The multiplicity of effects, gunshots, falcon, increase the fear.
3. The numerous effects ensure that, for example, they receive 2, 3 or 4 scaring actions within a flight of 4 minutes around the site.
4. The high intensity of the actions is so frightening for the birds that they do not land on the place.

Referring to FIG. 2, a rotating-hunter (2) that may be used to perform a method according to the invention is illustrated. A rotating-hunter (2) is a silhouette of a man (4) holding a gun (6) and rotatably mounted on a base (5). Typically, the rotating-hunter (2) further comprises two cannons (9) that intermittently emit two loud bangs resembling the noise of a 12-gauge shotgun. It may be propelled by propane gas (7) and the frequency of the detonations is from 1.5 to 60 minutes. This delay depends on the species of birds or animals, the density of birds and the kind of place to protect. The rotating-hunter is provided with a timer automated start/stop powered by a battery. Rotating-hunters are already known in the art and do not need further description.

The rotating-hunter has a very efficient dissuasive effect on birds and animals. The elements of its dissuasion are the following. The hunter is very visible as placed at 3.00 m from the ground. The lure hunter is permanently moving with the wind and the detonations. The noise of the detonations is variable as the cannons move with the wind.

This device is efficient against every kind of bird and animal.

Figure 3:
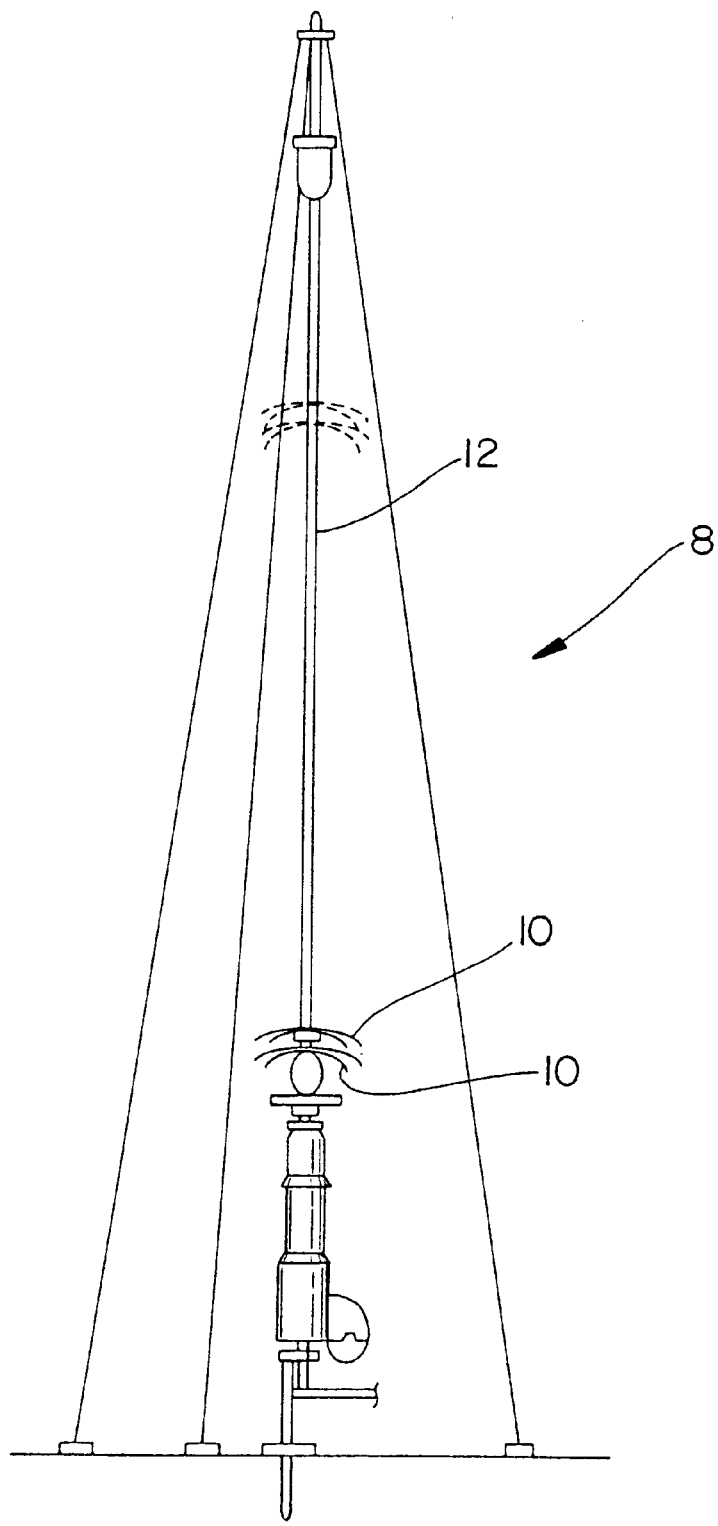
FIG. 3 is a side elevational view of a falcon-imitator used in combination with other bird frightening devices for performing a preferred embodiment of the method according to the present invention.

Referring to FIG. 3, a falcon-imitator (8) that may be used to perform a method according to the present invention is illustrated. The falcon-imitator (8) consists of pieces of leather or plastic (10) that are shot up along a pole (12) with an accompanying bang. The leather or plastic pieces (10) then spread and flap like a falcon's wings as they drop back to the base of the device. The falcon-imitator (8) may be propelled by propane gas or other means known in the art. The rate of the detonations is regulated by the flow of gas from 1.5 to 30 minutes. Usually, it starts in the morning and stops at night with an automatic clock which is easily set and powered by a battery. This device is not very noisy and may be located in urban areas. Falcon-imitators are already known in the art and do not need further description.

The elements of the dissuasion of the falcon-imitator are the following. It has a dual effect. The attenuated detonation alerting the birds and the lure sliding up and down and imitating falcon flight are scaring the birds away. The high pole (12) which could be 8 meters makes the lure visible from far away.

This device is efficient against every bird including ospreys.

Other types of rotating-hunters (not illustrated) may be used with a method according to the present invention. A rotating-hunter without a gunshot system may be used where it is not possible to set up a rotating-hunter with a gunshot because of the noise. However, it is interesting to have the benefit of the action of the silhouette.

Rotating-hunters not using propane for propulsion but where two alternating detonations may be recorded and emitted by loudspeakers as well as distress calls according to the species of birds to be frightened away may be used. The calls may be emitted after the detonations. Some birds, like pigeons, cannot be frightened by distress calls, then predatory calls may be emitted.

A rotating-hunter emitting ultrasounds and specialized against animals in urban sites and particularly the squirrels and the raccoons may be used. In this case, the basic dissuasion is an ultrasonic barrier with strong power and variable rhythm. Violent short dissuasion may be added by emitting two alternating detonations and sounds, such as dogs barking or predator shouts.

A rotating-hunter may be used with loudspeakers. In this case, the gunshots are transmitted by several directional loudspeakers which, for example, send the noise towards the peak of the trees.

Preferably, screamers may be used in combination with other animal frightening devices. Screamers are very efficient to scare away nocturnal animals which pillage culture, such as rabbits, deer, boars and other animals which may ravage at night. Screamers include an electronic procedure using loudspeakers to project sound unpleasant to animals, especially mammals. A "potentiometer" adjusts the screamer power and allows it to emit ultrasounds. It also includes the "alternating" projection of luminous flashes to which animals have been proven to be sensitive.

Preferably, in order to complete the actions of a rotating-hunter and a falcon-imitator, pistol with banger and cracker pellets may be useful. The bird scaring pellets may be used in very special cases. For example, to dislodge the birds when setting up the devices for the first time, during the dislodging phase, during the dissuasion phase, when some birds try to return and during the controlling phase, regularly once or twice a week in neighboring places where the birds tend to rest.

Two kinds of pellets, banger and cracker pellets are preferably used which are launched by a pistol. This action is very efficient to drive out the birds which have been living at some places for a long time.

Accessory equipments may be used with the bird frightening devices in order to improve the method or to render it less noisy for the neighbors. For example, concrete anti-noise screens consisting of semi-cylindric acoustic screens made of concrete may be installed. These screens are used to control the sound level of rotating-hunters and falcon-imitators throwing the noise towards the area where the birds are to be scared. It is possible to use as many lengths or heights of screens as necessary to attenuate the sound level as low as necessary. For example, in some places, it is possible to have three extension structures one over the other, to reach 3.30 m. Moreover, when the rotating-hunter is used with this screen, it seems to be in the hut of a hunter and that increases the dissuasion.

A noise trap may be installed for the falcon-imitator. A noise trap is made of concrete and is used to pick up the noise where it is emitted, and project it upwards rather than horizontally.

Noise level could be an inconvenience in urban areas. It is preferable to maintain the noise level within the country or town norms, and various means may be used to attenuate the sound. Examples of those are the following:

concrete anti-noise screen with two or three extension structures for rotating-hunter and falcon-imitator;

noise trap for falcon-imitator; and simple screen for falcon-imitator.

Figure 4:
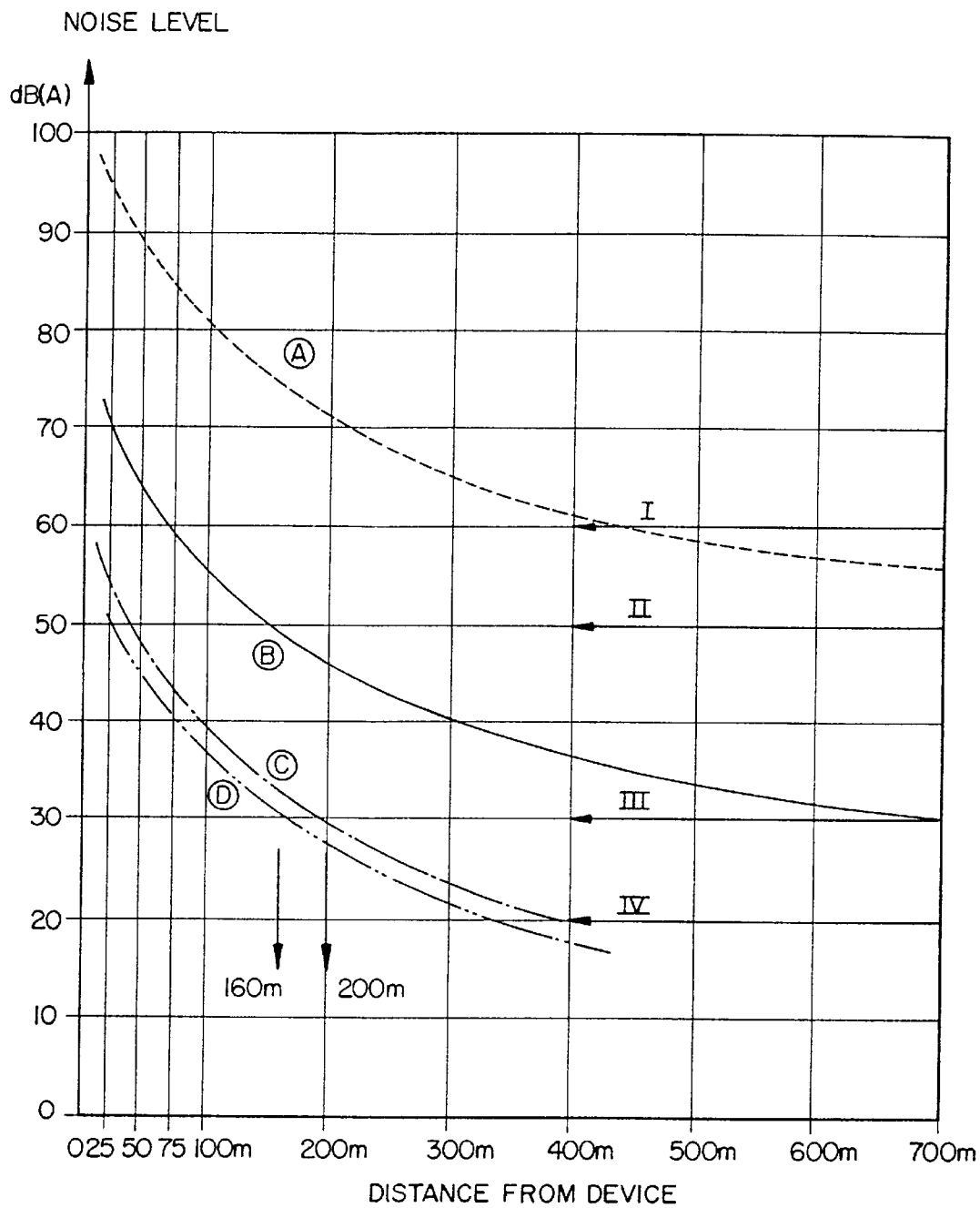
FIG. 4 is a graph of normalized noise level according to the distance from a rotating-hunter.

FIG. 4 sets the prescription of anti-noise equipments according to the distance between a rotating-hunter and the neighboring houses, the auditive comfort rules developed by the applicant, the International and Canadian norms.

The arrow I corresponds to the maximum noise level during daytime and evening, generally accepted by the International norms, such as Canadian norms.

For example, the maximum noise level accepted by International norms during daytime and evening is 60 decibels.

The arrow II corresponds to the maximum noise level acceptable by International norms for the night: this level is 50 decibels.

The arrow III corresponds to the normalized noise level which is not disturbing during daytime and night, and arrow IV corresponds to the normalized noise level inaudible for most human beings.

Levels given by arrows III and IV are the auditive comfort rules developed by the applicant.

The normalized noise level corresponds to the average noise level recorded during a given time. It usually corresponds to the peak level of the devices minus 25 decibels (dB).

Curve A corresponds to the peak noise level of the rotating-hunter with respect to the distance from the rotating-hunter.

Curve B corresponds to the normalized noise level of a rotating-hunter with respect to the distance from the rotating-hunter. This level equals level curve A minus 25 dB (decibels).

Curve C corresponds to the normalized noise level of a rotating-hunter provided with two structures of concrete anti-noise screen with respect to the distance from the rotating-hunter.

Curve D corresponds to the normalized noise level of a rotating-hunter provided with three structures of concrete anti-noise screen with respect to the distance from the rotating-hunter.

For example, if a rotating-hunter is installed over 700 m from the neighboring houses, no screen is necessary as the noise level is 30 dB (decibels). If the rotating-hunter is installed between 200 m and 700 m from the neighboring houses, it is preferable to use two structures of concrete screen in order to obtain 30 dB. And if the rotating-hunter is installed between 160 m and 200 m from the neighboring houses, it is preferable to use three structures of concrete screen.

Figure 5:
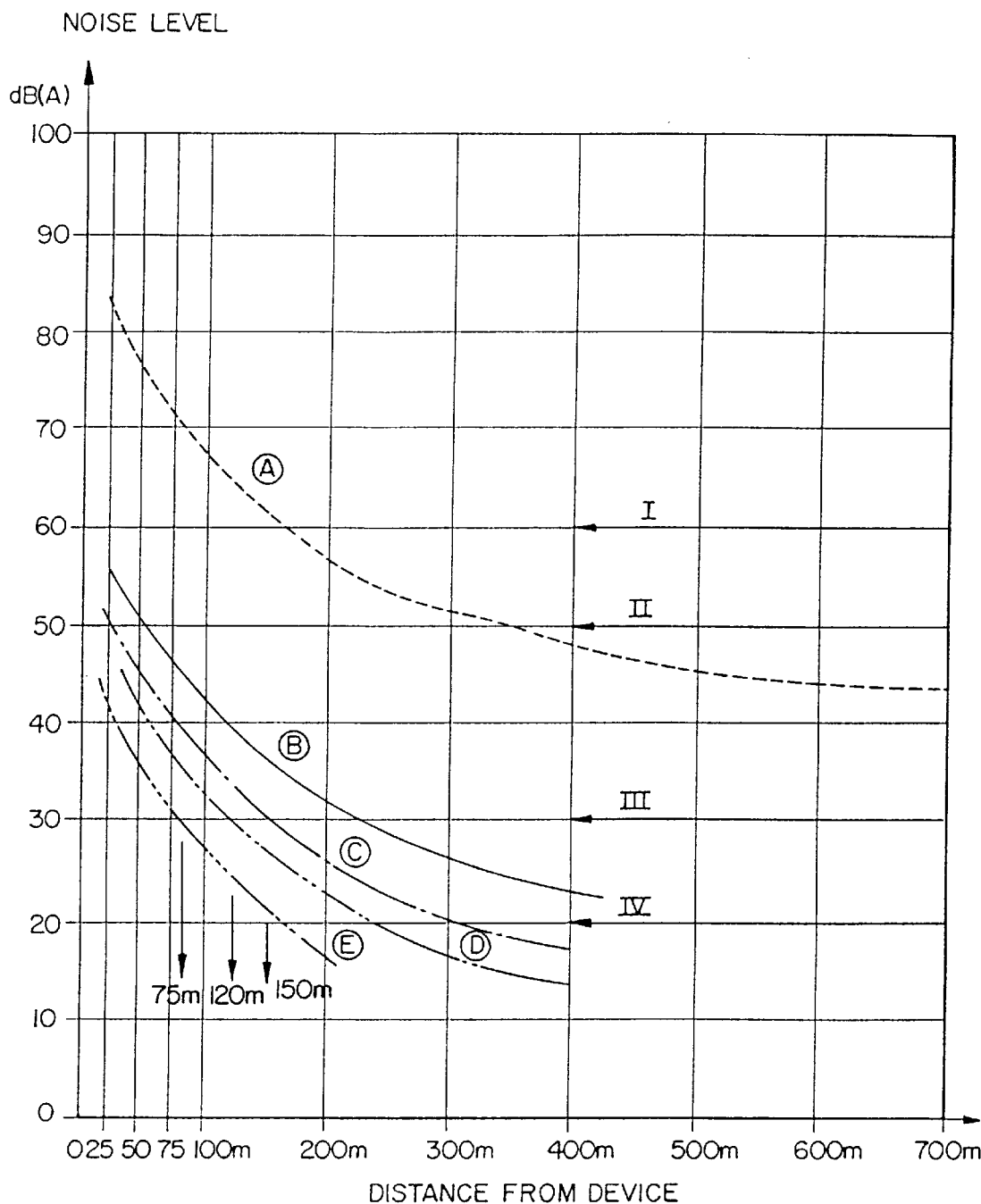
FIG. 5 is a graph of normalized noise level according to the distance from a falcon-imitator.

FIG. 5 sets the prescription of anti-noise equipments according to the distance between a falcon-imitator and the neighboring houses, and the auditive comfort rules developed by the applicant. The description of arrows I to IV and curves A to D is the same as for the graph illustrated in FIG. 4, except that it applies to the falcon-imitator.

Curve E corresponds to the normalized noise level of a falcon-imitator provided with three structures of concrete anti-noise screen and a noise trap.

For example, if a falcon-imitator is installed over 200 m from the neighboring houses, no screen is necessary as the noise level is 30 dB (decibels). If the falcon-imitator is installed between 150 m and 200 m from the neighboring houses, it is preferable to use two structures of concrete screen in order to obtain 30 dB. If the falcon-imitator is installed between 120 m and 150 m from the neighboring houses, it is preferable to use three structures of concrete screen. And if the falcon-imitator is installed between 75 m and 120 m from the neighboring houses, it is preferable to use three structures of concrete screen and a noise trap.

The falcon-imitator and rotating-hunter may be raised by installing these on a wood base. Wood bases are preferably used on beaches, parks, pedestrian paths.

Preferably, the frightening devices may be controlled with weekly electronic timers. For example, sometimes, people want the devices to be stopped for the week-end, or work from time to time, to reduce the noise for example. The timer allows the programming of various rhythms of work for every week.

In some cases, it may be interesting to launch the working of the devices when a bird or animal is coming to the site. Therefore, in another preferred version of a method according to the invention, the controlling phase (c) may further comprise the following steps: detection of any movement on or above the site with a movement detector and an automatic actuation of at least one of the frightening devices upon detection of a movement by the movement detector. In this case, the surprise is total and the frightening very efficient. The devices may be set to work a few minutes after the departure of the birds or animals. Preferably, many detectors of movement and an electronic system of control are also installed on the site for performing this particular preferred method. The advantages of such automation are the following. There is no dissuasion when there is no bird or animal. The scaring effect is very efficient and it provides a silent environment while the birds or animals do not return back to the site.

Figure 6:
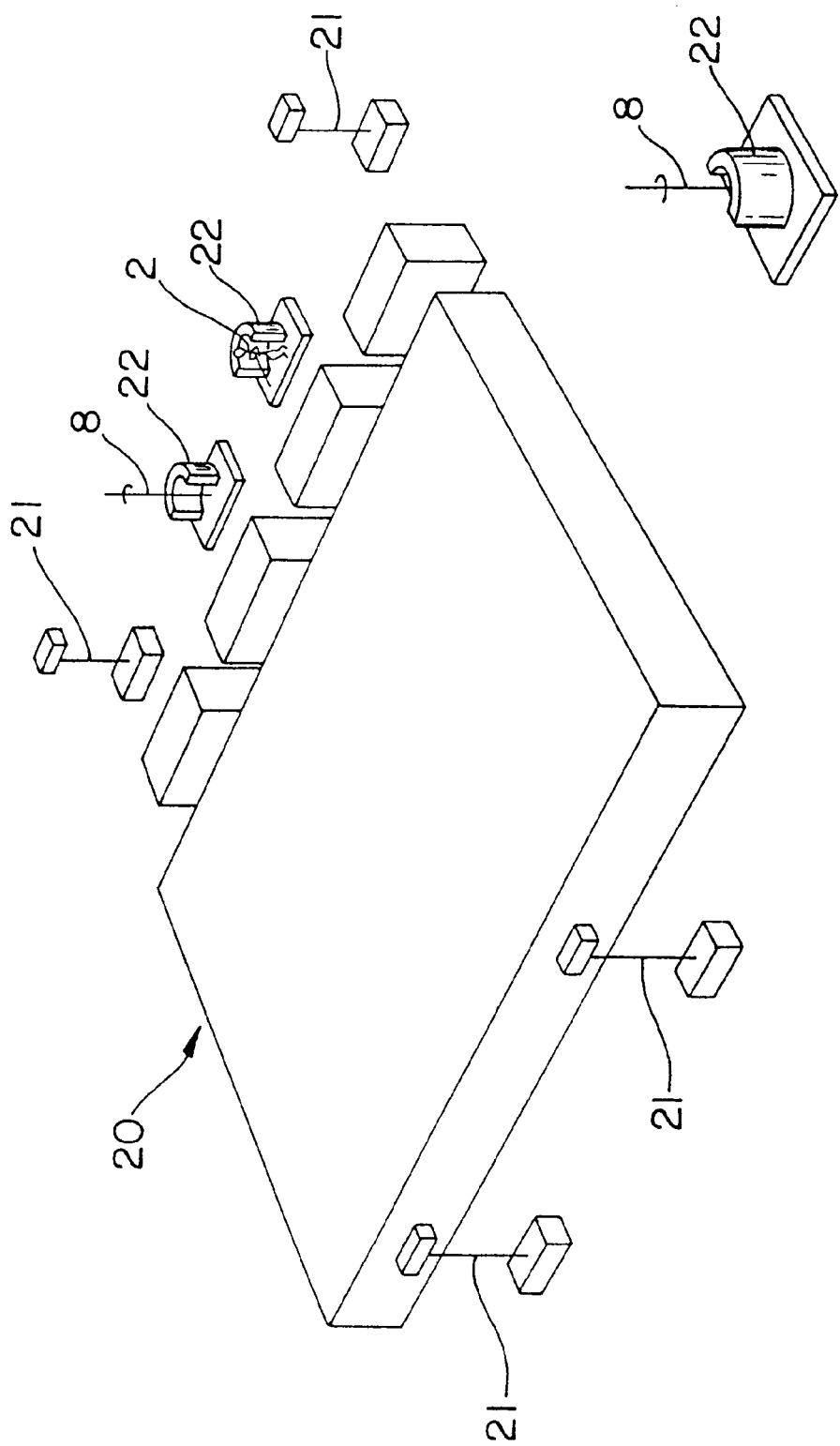
FIG. 6 is a schematic perspective view showing the setting of equipments for performing a preferred embodiment of a method according to the invention.

Referring to FIG. 6, a protected site (20) including movement detectors (21) is illustrated. As mentioned before, this protected site (20) may be selected from the group consisting of airports, landfills, industry areas, pisciculture, electric transformer stations, cereal silos, agricultural fields, public parks, waste water treatment stations and beaches, the number of bird frightening devices installed on the site depending on the selected site (20). In the illustrated case, two falcon-imitators (8) and one rotating-hunter (2) each combined with a concrete anti-noise screen (22) are also installed on the site.

According to another preferred embodiment of a method according to the invention which could be performed on a site where no birds or animals have settled in yet but where it is expected that they will soon settle, for example on the site of an airport, a waste water treatment station, etc., where the birds are going to arrive in spring, the method simply comprises:

a) a preparation phase where at least two animal frightening devices are installed on the site, said devices being selected from the group consisting of rotating-hunters and falcon-imitators, the number of said devices installed on the site depending on the kind of site and the surface area of said site; and b) a controlling phase to permanently prevent any bird or animal from settling on the site, the controlling phase including a continuous action of said frightening devices.

The three following factors of the actions explain why the birds or animals do not come to the place which is preserved and do not become accustomed to these scaring effects:

1. The place is very hostile and dangerous (gun, falcon, . . . ) at all times, from before sunrise to sunset.
2. The multiplicity of effects, gunshots, falcon, etc., increases the fear.
3. The numerous effects ensure that they receive 2, 3 or 4 scaring actions, for example, during a flight of 4 minutes around the site for the birds (the gunshot is heard at 1,000 meters from the device), or within a distance of 1 kilometer for the animals.

A method according to the present invention and the combinations of devices, equipment and techniques constitute a whole system which is not prejudicial for the wildlife. It is an ecological method. It presents many advantages: it is a natural method, it is easy to install, easy to use, it has full autonomy, it is of a reasonable price, compared to quality and service and it covers a large area. Most of all, thanks to the particular method of using and installing the frightening devices, birds and animals do not become accustomed to the devices, neither after two hours, nor after two days, nor after two months.

Although two preferred embodiments of the invention have been described in detail herein and illustrated in the accompanying drawings, it is to be understood that the invention is not limited to these precise embodiments and that various changes and modifications may be effected therein without departing the scope or spirit of the present invention.

What is claimed is:

1. A method of permanently eliminating pesky birds from a site having a given surface area, said method comprising:
   a) a dislodging phase comprising the following steps:
      (1) installing at least two bird frightening devices on the site, said devices being selected from the group consisting of rotating-hunters and falcon-imitators, the number of said devices installed on the site depending on the kind of site and the surface area of the site, and
      (2) intensive action of said bird frightening devices and emission of gunshot blast sounds for a duration of approximately one hour to dislodge said pesky birds residing on or near to the site, the bird frightening devices each being set to emit at least one detonation every 1.5 minutes,
   b) a dissuasion phase, following the dislodging phase, to dissuade the pesky birds from returning to the site, said dissuasion phase comprising the following steps:
      (1) cleaning of the site including removal of any nest present on the site, and
      (2) active action of said bird frightening devices for at least one day, said active action being less severe than the intensive action of the dislodging phase a), the bird frightening devices each being set to emit one detonation per three minutes at least; and
   c) a controlling phase, following the dissuasion phase, to permanently prevent a bird from settling on the site, the controlling phase including a continuous action of said bird frightening devices whereby each device is set to emit 1 to 40 detonations per hour.

2. A method as claimed in claim 1, wherein each of said bird frightening devices has a given noise level which is controlled during each phase of said method.

3. A method as claimed in claim 2, wherein the controlling phase c) further comprises the following steps:
   detection of any movement on or above the site with a movement detector; and
   automatic actuation of at least one of said bird frightening devices upon detection of a movement by the movement detector.

4. A method as claimed in claim 1, wherein said site is selected from the group consisting of airports, landfills, industry areas, pisciculture, electric transformer stations, cereal silos, agricultural fields, public parks, waste water treatment stations and beaches, and wherein the number of bird frightening devices installed is dependent upon the type of site selected.

5. A method as claimed in claim 4, wherein said site is an airport having a surface area comprised between 200 and 400 hectares and wherein two rotating-hunters and two falcon-imitators are installed on the site.

6. A method as claimed in claim 4, wherein said site is a landfill area having a surface area comprised between 16 and 30 hectares and wherein two rotating-hunters and two falcon-imitators are installed on the site.

7. A method as claimed in claim 4, wherein said site is an electric transformer station having a surface area comprised between 2 and 4 hectares and wherein three falcon-imitators are installed on the site.

8. A method as claimed in claim 4, wherein said site is a waste water treatment station having a surface area comprised between 2 and 8 hectares and wherein two rotating-hunters and one falcon-imitator are installed on the site.

9. A method as claimed in claim 1, wherein said rotating-hunter comprises two guns adapted to discharge shots in opposite directions.

* * * * *